(12) United States Patent
Matsuzaki

(10) Patent No.: US 6,926,124 B2
(45) Date of Patent: Aug. 9, 2005

(54) FLOATING DISK BRAKE

(75) Inventor: Yoshiki Matsuzaki, Nishikamo (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/870,159

(22) Filed: Jun. 18, 2004

(65) Prior Publication Data

US 2004/0256182 A1 Dec. 23, 2004

(30) Foreign Application Priority Data

Jun. 20, 2003 (JP) ........................ 2003-175897

(51) Int. Cl.[7] .................... F16D 65/02; F16D 55/224
(52) U.S. Cl. .................... 188/73.45; 188/73.44
(58) Field of Search ................ 188/73.44, 73.45, 188/73.1, 73.42, 72.2, 73.43

(56) References Cited

U.S. PATENT DOCUMENTS

| | | | | |
|---|---|---|---|---|
| 4,061,209 A | * | 12/1977 | Gee et al. ............ | 188/73.36 |
| 4,310,075 A | * | 1/1982 | Johannesen et al. ..... | 188/73.45 |
| 4,418,798 A | * | 12/1983 | Johannesen et al. ..... | 188/73.45 |
| 4,609,078 A | * | 9/1986 | Bach et al. ............ | 188/73.43 |

FOREIGN PATENT DOCUMENTS

JP    7-19629    4/1995

* cited by examiner

*Primary Examiner*—Douglas C. Butler
(74) *Attorney, Agent, or Firm*—Burns, Doane, Swecker & Mathis, LLP

(57) ABSTRACT

A floating disk brake having a caliper designed so as to be movable more freely in the radial direction of the rotor following any run-out or thermal expansion of the rotor and movable less freely in the tangential direction of the rotor to reduce uneven wear of the pads, thereby prolonging the life of the pads and reducing the possibility of fading at minimum cost. The caliper is supported on a mount through slide guides so as to be slidable in the direction of the axis of the rotor of the brake. The slide guides each include a slide pin fixed to the caliper, and a pin hole formed in the mount to receive the slide pin. A first clearance is defined between the mount and the caliper in a direction tangential to the rotor, and a second clearance is defined between the slide pin and the pin hole of each slide guide such that the first clearance is smaller than the second clearance.

2 Claims, 3 Drawing Sheets

FLOATING DISK BRAKE

BACKGROUND OF THE INVENTION

This invention relates to a floating disk brake used for braking of a vehicle, more specifically a floating disk brake which can reduce uneven wear of friction pads (hereinafter simply referred to as pads) and thus reduce fading.

FIG. 4 shows a typical floating disk brake. It comprises a rotor 5 (disk rotor), a pair of pads 4-1 and 4-2 provided on both sides of the rotor 5 to face the braking surfaces of the rotor, and a caliper 1 formed with a cylinder in which is slidably received a piston 3 so as to oppose one of the pads, i.e. the pad 4-1. The caliper 1 further includes an outer claw 1a provided so as to face the other pad 4-2. The pad 4-1 is pressed by the piston 3 against the rotor 5, while the other pad 4-2 is pressed against the rotor 5 by the outer claw 1a, which is moved toward the rotor by reaction force when the piston 3 is moved toward the rotor. Both pads are thus brought into frictional contact with the rotor, thus applying braking force to the rotor.

This floating disk brake further includes slide guide portions 6 through which the caliper 1 is supported on a mount (stationary member) 2 so as to be slidable in the axial direction of the rotor 5. Each slide guide portion 6 comprises a slide pin 6a extending in the axial direction of the rotor and fixed to one of the caliper 1 and the mount 2 (caliper 1 in the example of FIG. 4), and a pin hole 6b formed in the other of the caliper 1 and the mount 2 (mount in the example of FIG. 4) to slidably receive the slide pin 6a. In order that the caliper 1 can move freely following any run-out or thermal deformation of the rotor 5, a fairly large clearance is provided between the slide pin 6a and the pin hole 6b of each slide guide portion 6. Further, in order to suppress rattling sounds of the caliper, a rubber bushing (not shown) is disposed between the slide pin 6a and the pin hole 6b of each slide guide portion 6.

A floating disk brake of this type is shown e.g. in Japanese utility model publication 7-19629.

By providing a large clearance between the slide pin and the pin hole of each slide guide portion to improve the followability of the caliper to any run-out or thermal deformation of the rotor, the caliper can move fairly freely in the radial and tangential directions of the rotor.

If the caliper 1 can move relatively freely in the tangential direction of the rotor, it tends to swing as shown by chain line in FIG. 4 during braking. This creates variation in the surface pressure distribution of the pads, which in turn increases uneven wear of the pads 4-1 and 4-2 in the tangential direction of the rotor. Uneven wear will shorten the life of the pads and promote fading.

One way to prevent this problem is to reduce the tangential (with respect to the rotor) clearance between the slide pin 6a and the pin hole 6b of each slide guide portion 6 compared to the radial (with respect to the rotor) clearance between the slide pin and the pin hole of each slide guide portion by e.g. forming the pin holes 6b in an oval shape (in cross-section), or forming a chamfer on each slide pin 6a so as to reduce only its diameter extending in the radial direction of the rotor. But it requires large expenses to form such complicated pin holes or slide pins.

An object of the present invention is to provide a floating disk brake having a caliper designed so as to be movable more freely in the radial direction of the rotor following any run-out or thermal expansion of the rotor and movable less freely in the tangential direction of the rotor to suppress uneven wear of the pads, thereby prolonging the life of the pads and reducing the possibility of fading at a minimum cost.

SUMMARY OF THE INVENTION

According to this invention, there is provided a floating disk brake comprising a rotor having a central axis, a mount, a caliper supported on said mount so as to be slidable in the direction of said central axis, and a slide guide through which said caliper is slidably supported on said mount, said slide guide including a slide pin and a pin hole in which is received said slide pin, wherein a first clearance is defined between said mount and said caliper in a direction tangential to said rotor, and a second clearance is defined between said slide pin and said pin hole, said first clearance being smaller than said second clearance.

In the present invention, the mount is used to restrict the movement of the caliper in a direction tangential to the rotor such that the caliper can move less freely in the tangential direction of the rotor, thereby reducing uneven wear of the pads.

The degree of freedom of the movement of the caliper in the radial direction of the rotor is adjusted by increasing or reducing the clearance between the slide pin and the pin hole so that the caliper can move relatively freely following e.g. thermal expansion of the rotor to reduce fading.

The degree of freedom of the movement of the caliper in the tangential direction of the caliper is determined by the first clearance defined between the caliper and the mount in the tangential direction of the rotor, while the degree of freedom of the movement of the caliper in the radial direction of the rotor is determined by the second clearance defined between the slide pin and the pin hole in the radial direction of the rotor. Thus, by determining the first and second clearances such that the first clearance is smaller than second clearance, the object of the present invention is achievable.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
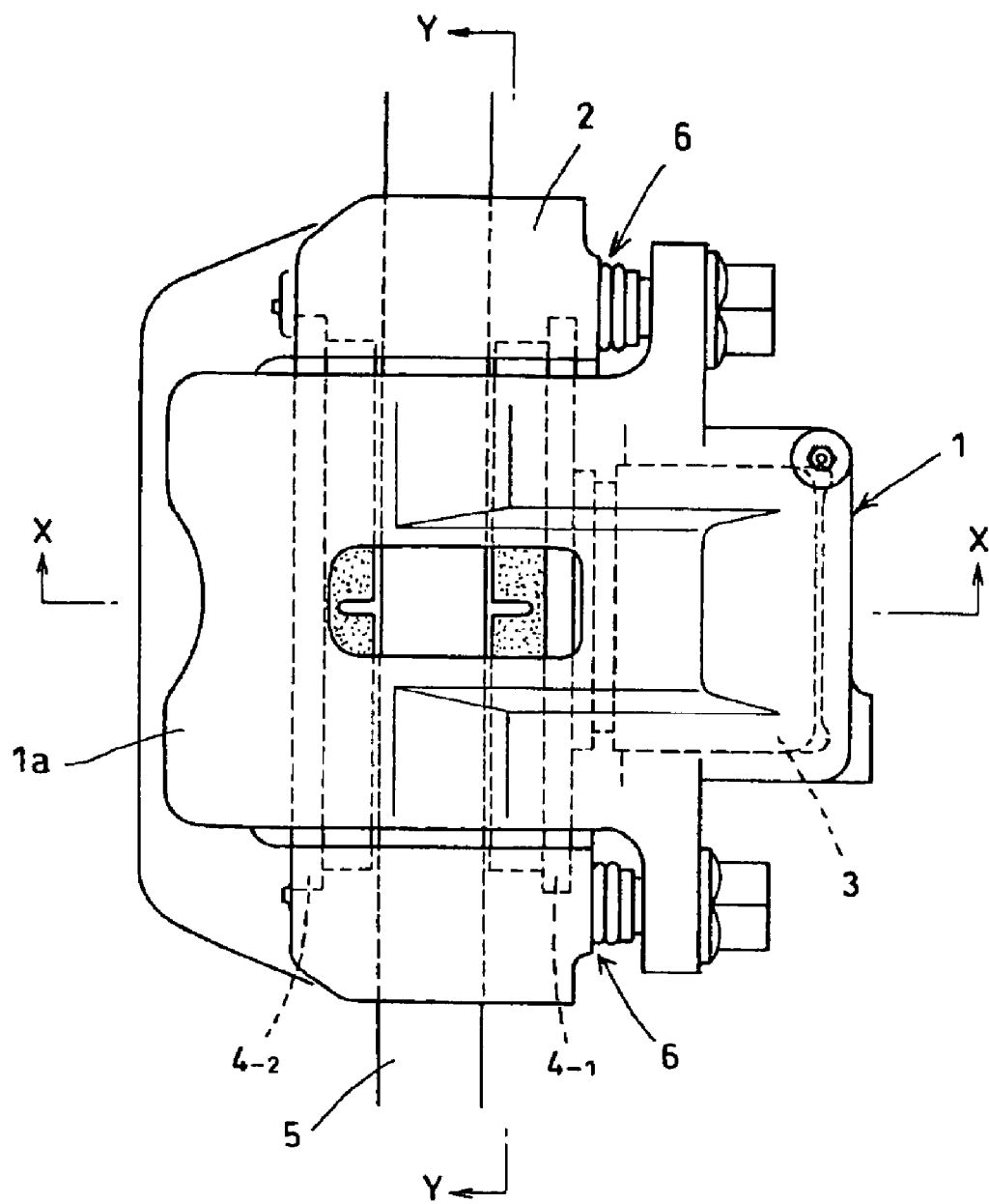
FIG. 1 is a plan view of a floating disk brake embodying the present invention.
Figure 2:
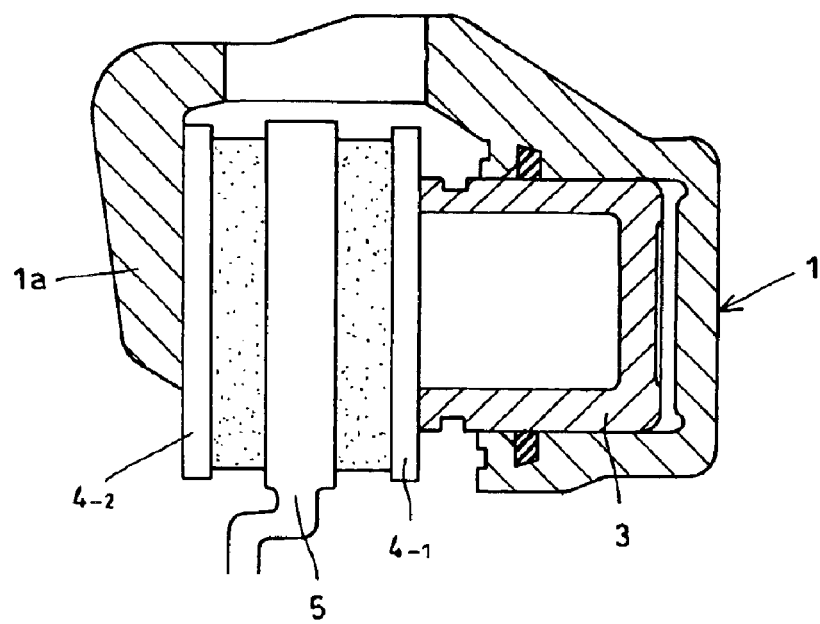
FIG. 2 is a sectional view along line X—X of FIG. 1.
Figure 3:
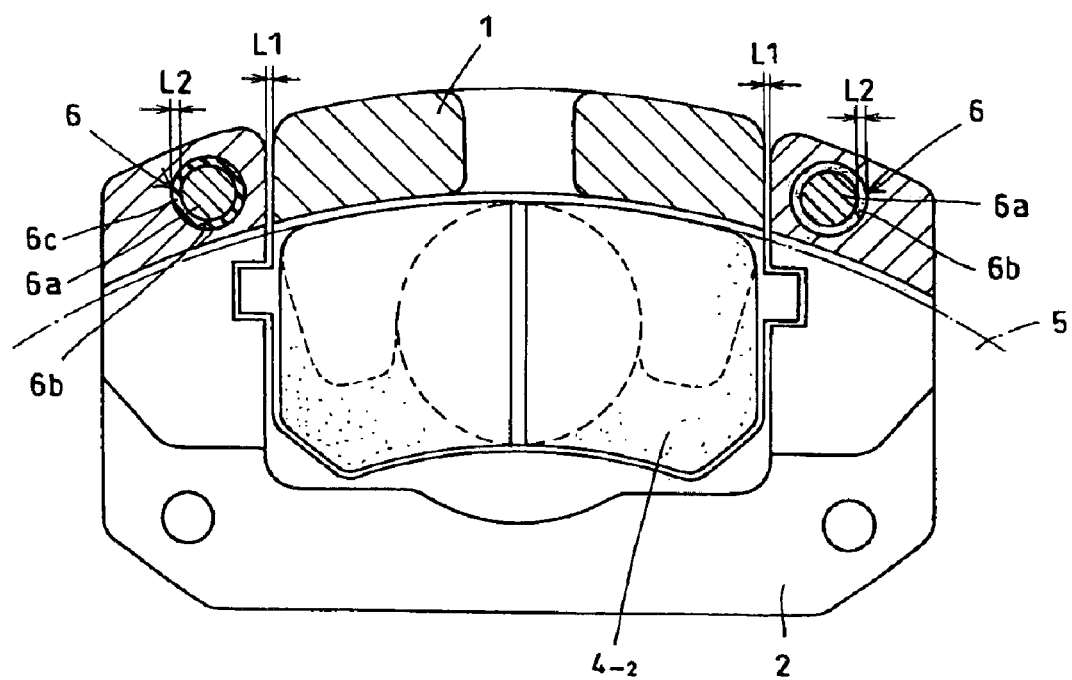
FIG. 3 is a sectional view along line Y—Y of FIG. 1.
Figure 4:
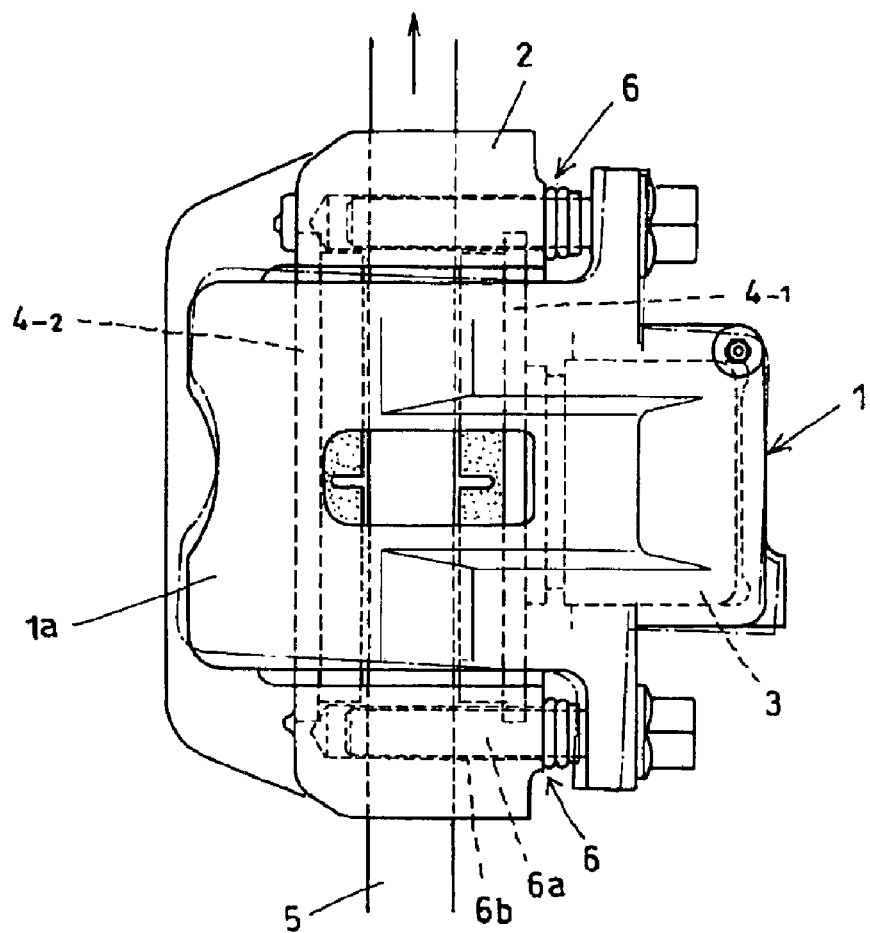
FIG. 4 is a plan view of a conventional floating disk brake.

Referring to FIGS. 1–3, the floating disk brake embodying the present invention includes a caliper 1, a mount 2, a piston 3 mounted in a cylinder formed in the caliper 1, pads 4-1 and 4-2, a rotor 5, and slide guides 6 each comprising a pin hole 6b formed in the mount 2 and a slide pin 6a fixed to the caliper 1 and inserted in the pin hole 6b.

The floating disk brake of the embodiment has two such slide guides, one provided at the leading side and the other at the trailing side of the caliper, but only one or more than two such guides may be provided.

Between the slide pin 6a and the pin hole 6b of each slide guide 6, a rubber bushing 6c is disposed as shown in FIG. 3. But if the disk brake has two such slide guides 6, the rubber bushing 6c in one of the two slide guides 6 may be omitted.

As shown in FIG. 3, clearances L1 are defined in the tangential direction of the rotor between the caliper 1 and the mount 2, while a clearance L2 is defined between the slide pin 6a and the pin hole 6b of each slide guide 6 such that the relation L1<L2 is met.

The clearances L1 are gaps present on both sides of the caliper 1 when the caliper 1 is received in a recess formed in the mount 2 so as to be located in the center of the recess. Each of the clearances L2 is a gap present between the outer periphery of the slide pin 6a and the inner wall of the pin hole 6b when the slide pin 6a is located in the pin hole 6b so as to be coaxial with the pin hole 6b. The slide pins 6a and the pin holes 6b both have a circular section. Thus, the clearances L2 are constant over the entire circumference thereof. This means that the caliper 1 can move twice the distance L2 relative to the mount 2 in the radial direction of the rotor.

On the other hand, when the caliper 1 moves in either tangential direction by a distance L1 from the position of FIG. 3, it will abut the mount 2 and cannot move any further in this direction. Thus, in the tangential direction, the caliper 1 can move only twice the distance L1 relative to the mount 2. Since the values L1 and L2 can be set independently of each other in the present invention, the caliper 1 can be designed so as to be movable by a greater distance in the radial direction of the rotor than in the tangential direction of the rotor relative to the mount.

With this arrangement, there is no need to form the slide pins 6a and/or the pin holes 6b in special, complicated shapes, so that the caliper can be manufactured at a lower cost. By designing the caliper 1 so as not to be movable so freely in the tangential direction of the rotor as in the radial direction of the rotor, the pads are less likely to be worn unevenly in the tangential direction of the rotor. Since the caliper 1 can move a greater distance in the radial direction of the rotor than in the tangential direction, the caliper can move relatively freely in spite of thermal deformation of the rotor. Fading is thus less likely to occur.

In summary, in the present invention, the movement of the caliper in the tangential direction of the rotor is restricted by the mount, while the movement of the caliper in the radial direction of the rotor is restricted by the clearance between the slide pin and the pin hole of each slide guide. With this arrangement, the caliper can be designed so as to be movable with a greater freedom in the radial direction of the rotor than in the tangential direction of the rotor without the need to form the slide pins and/or the pin holes in special, complicated shapes. This in turn makes it possible to suppress uneven wear of the pads in the tangential direction of the rotor and for the caliper to move relatively freely following e.g. thermal deformation of the rotor This stabilizes dynamic surface pressure of the pads, and reduces the possibility of fading, which in turn reduces uneven wear of the pads in the radial direction of the rotor as well. The overall result is a prolonged life of the pads.

What is claimed is:

1. A floating disk brake comprising a rotor having a central axis, a mount, a caliper supported on said mount so as to be slidable in the direction of said central axis, and a slide guide through which said caliper is slidably supported on said mount, said slide guide including a slide pin and a pin hole in which is received said slide pin, wherein with respect to said mount, said caliper is movable less freely in a direction tangential to said rotor than in a radial direction of said rotor;

wherein said pin is fixed to one of said mount and said caliper, and said pin hole is formed in the other of said mount and said caliper; and wherein a first clearance is defined between said caliper and said mount in a direction tangential to said rotor, and a second clearance is defined between said slide pin and said pin hole, said first clearance determining the freedom of movement of said caliper in the tangential direction of said rotor relative to said mount, said second clearance determining the freedom of movement of said caliper in the radial direction of said rotor relative to said mount, said first clearance being smaller than said second clearance, whereby said caliper is movable less freely relative to said mount in the tangential direction of said rotor than in the radial direction of said rotor.

2. A floating disk brake as claimed in claim 1 further comprising a rubber bushing disposed between said slide pin and said pin hole.

* * * * *